(12) United States Patent
Huenke (10) Patent No.: US 7,073,867 B2
(45) Date of Patent: Jul. 11, 2006

(54) CARGO BUCKET SYSTEM

(76) Inventor: Paul Huenke, 375 Glassboro Rd., Monroeville, NJ (US) 08343

( * ) Notice: Subject to any disclaimer, the term of this patent is extended or adjusted under 35 U.S.C. 154(b) by 0 days.

(21) Appl. No.: 10/792,128

(22) Filed: Mar. 4, 2004

(65) Prior Publication Data

US 2005/0194831 A1   Sep. 8, 2005

(51) Int. Cl.
 *B60P 1/04* (2006.01)
(52) U.S. Cl. .................................................. 298/1 A
(58) Field of Classification Search ............ 298/1 A, 298/1 B, 10, 17 R, 19 R; 296/37.6
See application file for complete search history.

(56) References Cited

U.S. PATENT DOCUMENTS

| 4,026,387 | A | * | 5/1977 | Abreu ..................... 414/541 |
| 4,266,821 | A | * | 5/1981 | Gillet ...................... 296/37.6 |
| 4,564,167 | A | * | 1/1986 | Smith ...................... 248/552 |
| 4,741,575 | A | * | 5/1988 | Sloan ...................... 298/12 |
| 4,802,709 | A | | 2/1989 | Jones |
| 5,375,773 | A | * | 12/1994 | Lewis ..................... 239/650 |
| 5,447,361 | A | | 9/1995 | Phillips |
| 5,624,223 | A | | 4/1997 | Lovato |
| 5,988,534 | A | * | 11/1999 | Kost et al. ............... 239/650 |
| 6,077,024 | A | * | 6/2000 | Trueblood ............... 414/462 |
| 6,089,478 | A | * | 7/2000 | Truan et al. ............. 239/675 |
| 6,170,724 | B1 | * | 1/2001 | Carter et al. ............. 224/404 |
| 6,196,634 | B1 | | 3/2001 | Jurinek |
| 6,238,166 | B1 | | 5/2001 | Collier |
| 6,318,808 | B1 | | 11/2001 | Shayne |
| 6,435,801 | B1 | | 8/2002 | Talbott |
| 6,712,415 | B1 | * | 3/2004 | Darbishire et al. ...... 296/37.1 |
| 2003/0189353 | A1 | * | 10/2003 | Moore ..................... 296/37.6 |

* cited by examiner

*Primary Examiner*—H Gutman
(74) *Attorney, Agent, or Firm*—Fish & Richardson P.C.

(57) ABSTRACT

A universal cargo bucket system for hauling or loading and unloading cargo from a vehicle is provided. The universal cargo bucket system includes an adjustable frame hingedly attached to the rear corner posts of a vehicle, a cargo bucket pivotally attached to the frame, a locking mechanism for securing the frame in an upright position to the rear corner posts and a handle for pivoting the cargo bucket. The width of the frame may be adjusted to fit a wide variety of makes and models of vehicles and can be adapted to attach to the rear corner posts of a truck in place of the tailgate, attach to the hitch receiver of a vehicle, or be towed by a vehicle.

4 Claims, 12 Drawing Sheets

CARGO BUCKET SYSTEM

TECHNICAL FIELD

This description relates to equipment for hauling, dumping or spreading cargo. More particularly, the description relates to a system that can be interchangeably attached to the tailgate receiver of a pickup truck or a hitch receiver, or towed on a trailer and used to carry cargo.

BACKGROUND

The high desirability of cargo carrying capacity in passenger vehicles is evidenced by the fact that pickup trucks are among the most popular selling motor vehicles in the United States. Pickup trucks are particularly desirable and well suited for carrying a wide variety of cargo, particularly compared to other non-commercial passenger vehicles, because of their rear payload beds. The cargo carrying abilities of pickup trucks may be used in a wide variety of applications from commercial to personal.

SUMMARY

In one general aspect, a cargo bucket system includes an adjustable frame hingedly attached to the rear corner posts of a vehicle such as pick-up truck in place of a typical tailgate. The frame may be locked in the upright position or extended as could a tailgate. The width of the frame is adjustable so that the frame may be attached to different makes and models of vehicles. Pivotally attached to the frame is a cargo bucket that may be used to carry cargo or load and unload cargo in and out of the bed of the vehicle for example. A handle may be used to pivot the cargo bucket in the forward or backwards direction while the frame is in either the upright position or the extended position.

In another general aspect, a component of the frame is replaced so that the cargo bucket system may be attached to the hitch receiver of a vehicle. The universal cargo bucket system also may be attached to a trailer that may be towed by a vehicle.

Particular implementations provide a new cargo carrying system that is adaptable to pickup trucks without requiring modifications or inserts to the truck bed. The system offers a versatile range of movement, is inexpensive and simple, and can be operated by a single user.

The details of different implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION OF THE INVENTION

Figures 1A, 1B:
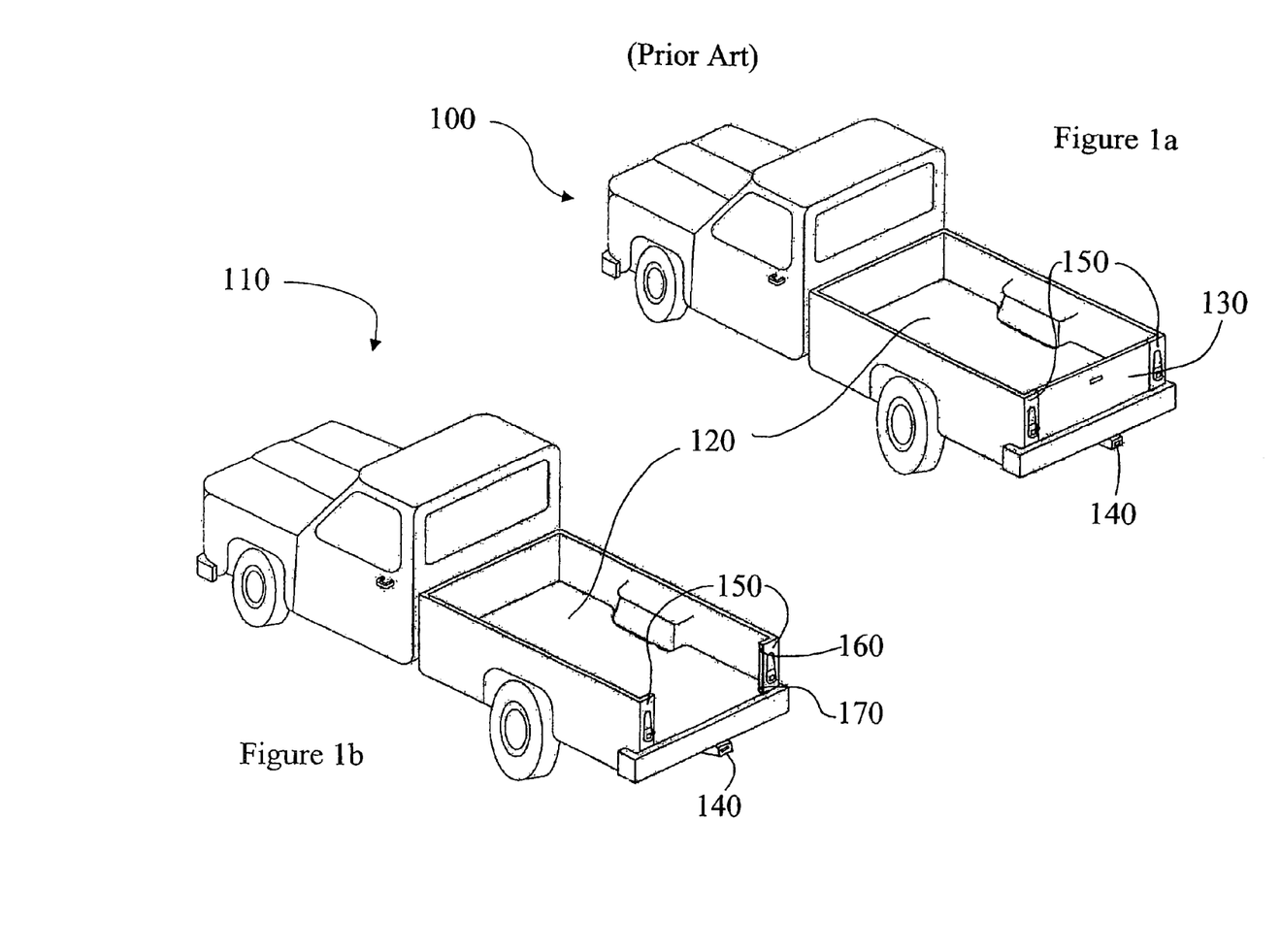
FIG. 1a illustrates a perspective view of a pickup truck with a tailgate and hitch receiver.
FIG. 1b illustrates a perspective view of a pickup truck without a tailgate.

Turning now to the drawings, FIG. 1a illustrates a perspective view of a pickup truck 100 with a tailgate and hitch receiver. The pickup truck 100 includes a bed 120, a tailgate 130, a hitch receiver 140, and a pair of rear corner posts 150.

FIG. 1b illustrates a perspective view of a pickup truck 110 with the tailgate 130 removed. Like the pickup truck 100, the pickup truck 110 also includes a bed 120, a hitch receiver 140 and rear corner posts 150. As illustrated in FIG. 1b, the rear corner posts 150 also include a locking mechanism 160 and a hinge receiver 170.

In operation, the tailgate 130 is typically hingedly attached to the rear corner posts 150 at the hinge receiver 170. This arrangement allows the tailgate 130 to pivot about the axis of the hinge receiver 170. In the closed position, as illustrated in FIG. 1a, the tailgate 130 is locked in place by a locking mechanism 160. The locking mechanism 160 of the tailgate 130 is typically engaged and disengaged by a handle (not shown) in the tailgate 130. Various configurations of hinges and locking rods are employed by different pickup truck manufacturers and are well known in the art.

Figure 2:
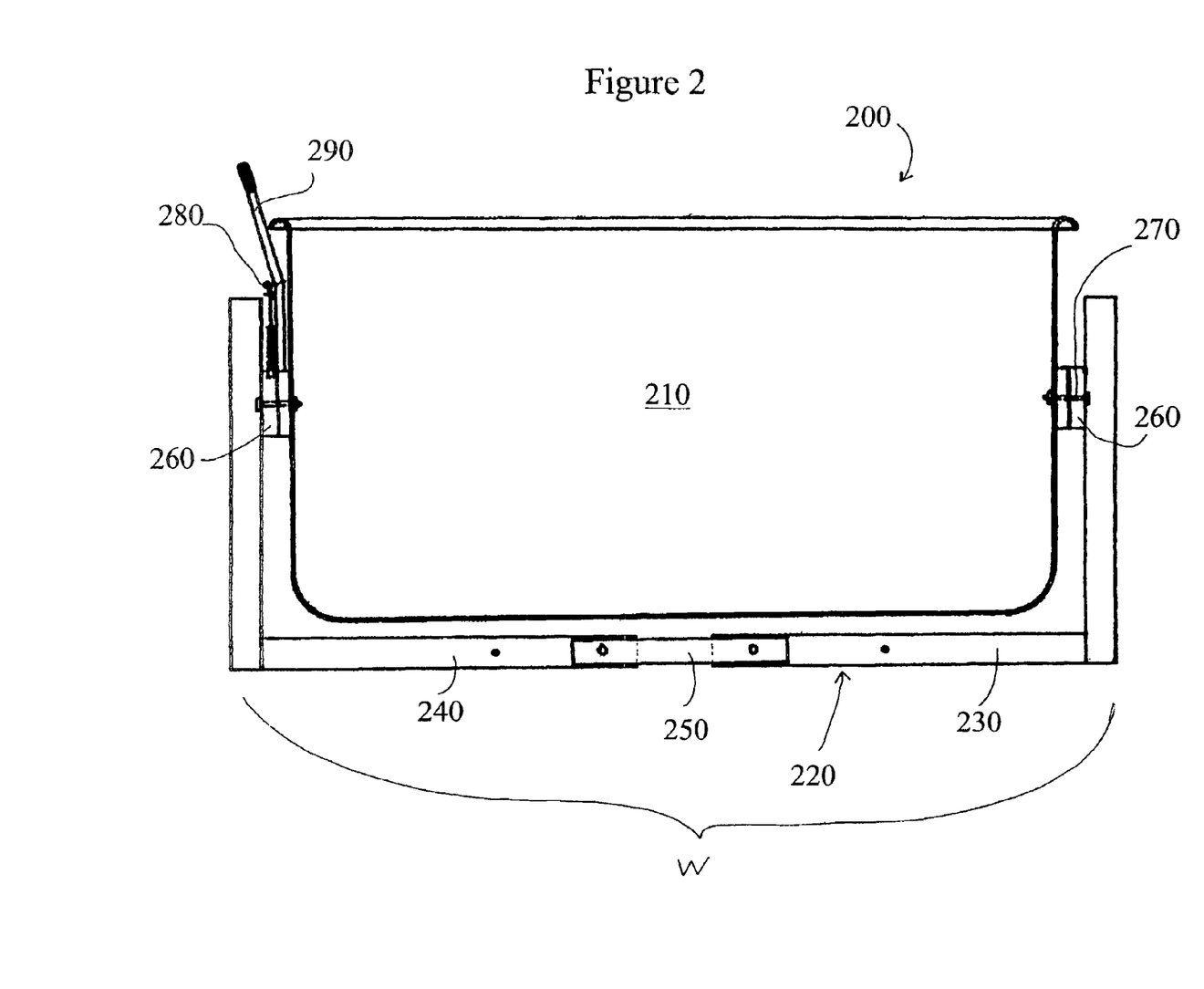
FIG. 2 illustrates a front view of a universal cargo bucket system.

FIG. 2 illustrates a front view of a universal cargo bucket system 200. The universal cargo bucket system 200 includes a cargo bucket 210, a frame 220, spacers 260, pivot bolts 270, a bucket lock mechanism 280, and a handle 290. The frame 220 further includes a right bar 230, a left bar 240, and an adjusting rod 250.

The right bar 230 and left bar 240 of the frame 220 are L-shaped and comprised of hollow tubular steel. However, they may be comprised of any material of sufficient strength and rigidity such as aluminum or other metals or plastic materials, for example. The right bar 230 and left bar 240 of the frame 220 are connected together by the adjusting rod 250.

In the illustrated implementation, the adjusting rod 250 is made of tubular steel and straight. The diameter of the adjusting rod 250 is such that it fits inside the hollow ends of the bottom of the right bar 230 and the left bar 240 as illustrated in FIG. 2. The adjusting rod 250 is secured to the right bar 230 and left bar 240 by fastening bolts (not shown). The adjusting rod 250 includes pre-drilled holes for the fastening bolts to pass through as illustrated in FIG. 2.

Similarly, the right bar 230 and the left bar 240 have predrilled holes for the fastening bolts to pass through. However, the right bar 230 and left bar 240 have numerous pre-drilled holes at various positions along the bottom as illustrated in FIG. 2. These pre-drilled holes allow the right bar 230 and left bar 240 to be positioned closer or further apart based on the holes selected such that the width W of the frame 220 may be adjusted by the user. The pre-drilled holes in the right bar 230 and left bar 240 are placed at pre-determined positions such that the width W of the frame 220 may be adjusted such that the frame 220 will fit in most tailgate receivers of popular model pickup trucks. Although the width between the rear corner posts 150 of various model pickup trucks may be different, these widths are well known, such that the frame may be designed to accommodate them. The adjustable nature of the frame 220 allows the system to be installed in a wide variety of vehicles. Other implementations may be designed for a specific vehicle and not adjustable.

The cargo bucket 210 is pivotally attached to the right bar 230 and left bar 240 of the frame 220 by pivot bolts 270. The cargo bucket 210 is comprised of a lightweight material such as steel reinforced polymer, but other implementations may employ any suitable material, such as metal, plastics, polymers or combinations thereof. The cargo bucket 210 is held securely in place between the frame 220 by the spacers 260. As shown, there are two spacers 260 on each side of the cargo bucket 210 with the spacers 260 closest to the cargo bucket 210 securely affixed to the cargo bucket 210 and the spacers 260 closest to the side of the right bar 230 and left bar 240 securely affixed to said right bar 230 and left bar 240 as further illustrated below with respect to FIG. 7b. The spacers 260 are comprised of metal and at least one spacer per side includes ball bearings as further discussed below with respect to FIG. 5. The ball bearings in the spacers 260 facilitate smooth pivoting of the cargo bucket 210 with less effort by the user. However, the spacers may also be comprised of other low-friction materials such as nylon without ball bearings.

In another implementation, the spacers 260 may include a gear system that reduces the force required to pivot the bucket, particularly when loaded with heavy cargo, even further. The width or number of spacers 260 may vary depending on the width W of the frame 220 when installed to ensure the cargo bucket 210 is securely positioned between the frame 220. The pivot bolts 270 pass through a hollow bushing (illustrated below in FIG. 6) in the right bar 230 and left bar 240, and then through the spacers 260 and the cargo bucket 210 as illustrated in FIG. 2. The bushing allows the pivot bolt 270 to move with minimal friction.

The handle 290 is securely affixed to one of the spacers 260 attached to the cargo bucket 210 as illustrated in FIG. 2. However, a handle 290 may be placed on both sides of the cargo bucket 210 and affixed as discussed above. The bucket lock mechanism 280 is attached to the handle and locks into grooves in the spacers 260 closest to the side of the right bar 230 and left bar 240 when in the engaged position as illustrated below in FIGS. 7a and 7b. In the engaged position, the bucket lock mechanism 280 locks the cargo bucket in place such that it cannot pivot. When the bucket lock mechanism 280 is disengaged by a user, the cargo bucket 210 may freely pivot in the forward or backward direction.

In other implementations, the spacers 260 may be geared to allow increased torque to be transferred to the cargo bucket 210 for easier dumping. A direct gear ratio of less than 2:1 may be used to reduce the distance that the handle 290 would have to travel to facilitate the complete dumping of the contents of the cargo bucket 210. Easier dumping may also be facilitated by adding a detachable extension to the handle 290 or moving the pivot point of the cargo bucket 210 lower. In a particular implementation, the pivot point is located slightly below and rearward of center of the cargo bucket 210.

In operation, the tailgate 130 of a pick-up truck or other vehicle is removed and replaced with the universal cargo bucket system 200. The frame 220 of the universal cargo bucket system 200 is hingedly attached to the rear corner posts 150 of a pick-up truck at the hinge receiver 170 as further discussed below. Thus, the frame 220 may pivot about the axis of the hinge receiver 170 as would a tailgate 130 in its typical operation. The frame 220 may be locked in an upright position by a locking mechanism or extended as further discussed below. In either the upright or extended position, the cargo bucket 210 may be pivoted in the forward or backward direction as discussed above and illustrated in FIGS. 3a–d. The cargo bucket 210 may be open as illustrated in FIG. 2 or may include a full or partial cover either permanently or removably attached to the cargo bucket 210.

Figure 3A:
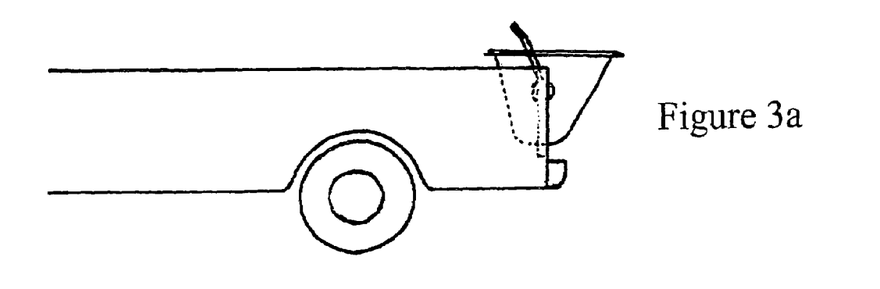
FIG. 3a illustrates a side view of the universal cargo bucket system of FIG. 2 in the upright position.
Figure 3B:
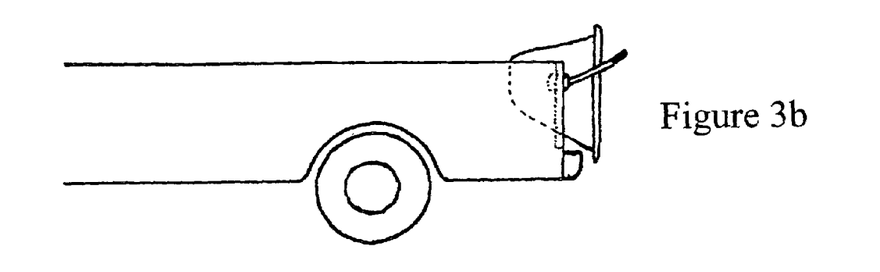
FIG. 3b illustrates a side view of the universal cargo bucket system of FIG. 2 in the dumping position.
Figure 3C:
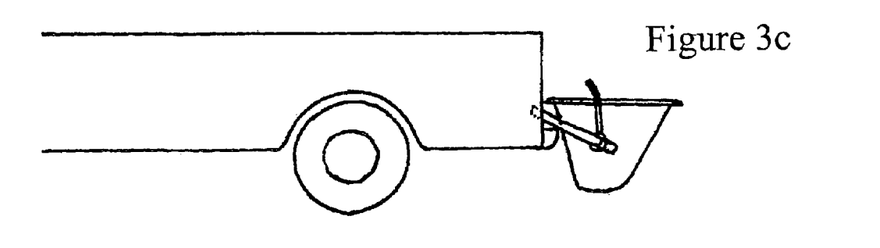
FIG. 3c illustrates a side view of the universal cargo bucket system of FIG. 2 in the extended upright position.
Figure 3D:
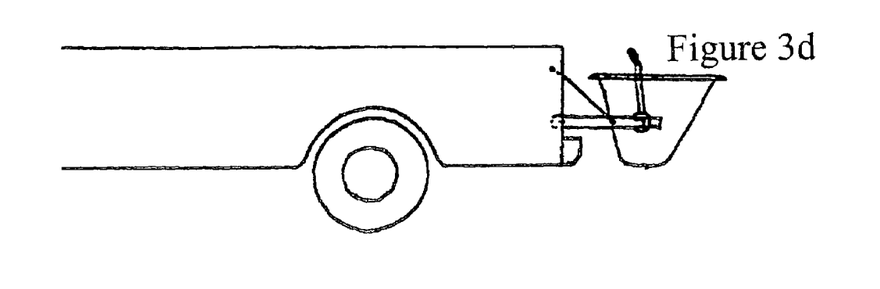
FIG. 3d illustrates a side view of another universal cargo bucket system in an extended upright position.

FIGS. 3a–d illustrate the universal cargo bucket system 200 in a number of positions. FIG. 3a illustrates the universal cargo bucket system 200 with the frame 220 in the upright position and the cargo bucket 210 in the upright position. FIG. 3b illustrates the universal cargo bucket system 200 with the frame 220 in the upright position and the cargo bucket 210 pivoted 90 degrees forward in a dumping position. FIG. 3c illustrates the universal cargo bucket system 200 with the frame 220 in the extended position and the cargo bucket 210 pivoted slightly rearwards so that it is in the upright position. Finally, FIG. 3d illustrates the universal cargo bucket system 200 in the extended position utilizing an extension brace to keep the frame 220 parallel to the ground when fully extended.

Figure 4A:
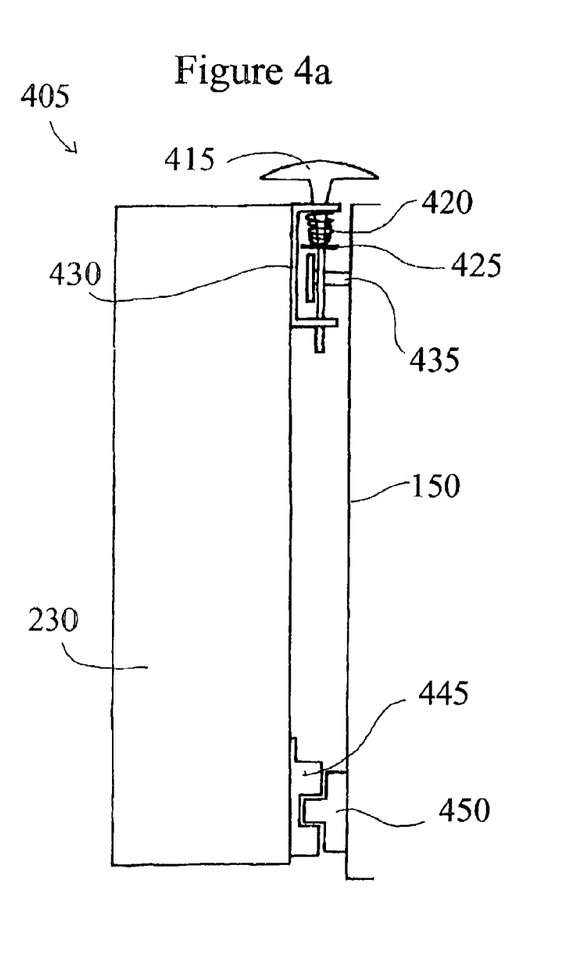
FIG. 4a illustrates a front view of the side attachment of the universal cargo bucket system of FIG. 2 to a tailgate.

FIG. 4a illustrates a front view of a side attachment 405 of the universal cargo bucket system to a tailgate. The attachment 405 includes a latch 415, a spring 420, a spring brace 425, a latch brace 430, a locking pin 435, the right bar 230, the corner post 150, a hinge receiver 445, and a hinge post 450.

The corner post 150 has a hinge post 450 securely attached at the bottom. The hinge post 450 corresponds to the hinge receiver 170 of FIG. 1b. Similarly, the bottom of the right bar 230 has a hinge receiver 445 compatible with the hinge post 450 securely attached. The right bar 230 is then hingedly attached to the corner post 150 by inserting the hinge post 450 into the hinge receiver 445 as illustrated in FIG. 4a. As explained above, numerous hinging mechanisms are well known in the art for different models of pick-up trucks, and different implementations may include other arrangements. The universal cargo bucket system 200 is thus installed by hingedly connecting both sides of the frame 220 to both rear corner posts 150 of a vehicle.

Figure 4B:
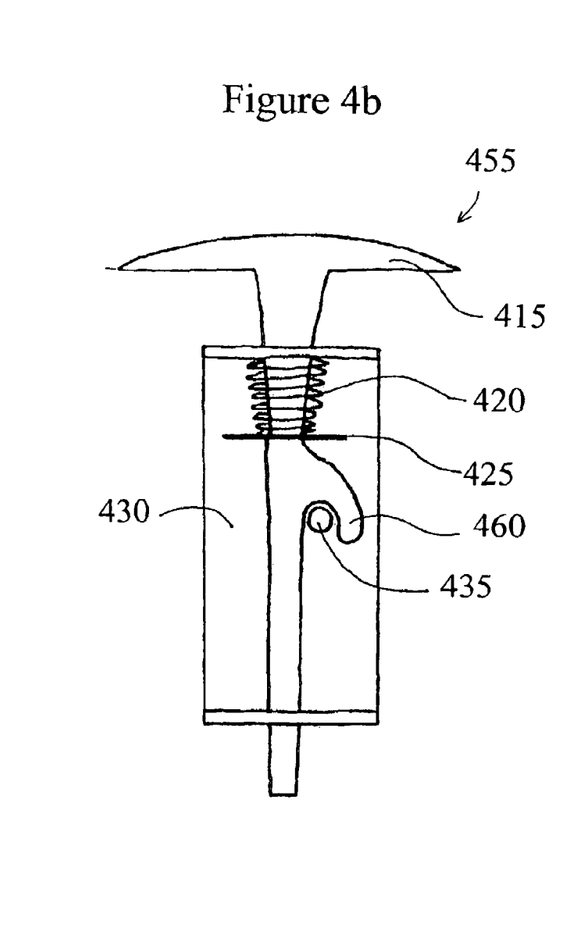
FIG. 4b illustrates a close-up side view of a locking mechanism of the universal cargo bucket system of FIG. 2.

As discussed above, the frame 220 of the universal cargo bucket system 200 may be locked in the upright position by a locking mechanism. FIG. 4b illustrates a close-up side view 455 of the locking mechanism of the universal cargo bucket system, and shows the latch 415, the spring 420, the spring brace 425, the latch brace 430, and the locking pin 435 of FIG. 4a. The latch 415 includes a latch hook 460.

Referring now to FIGS. 4a and 4b, the latch brace 430 is securely affixed to the upper portion of the right bar 230. The latch brace 430 is C-shaped and comprised of metal, though it may also be comprised of any other suitable material. The latch brace 430 includes openings at the top and bottom so that the latch 415 may be movably inserted into the latch brace 430 as illustrated in FIGS. 4a and 4b. The spring brace 425 is a circular plate attached to the latch 415 above the latch hook 460 and extending around the diameter of the latch 415. The spring 420 is positioned between the spring brace 425 and the upper surface of the latch brace 430 as illustrated in FIG. 4b. The spring 420 provides a downward force on the latch 415.

The locking pin 435 is comprised of metal and is securely fastened to the upper portion of the corner post 150 as illustrated in FIG. 4a. In the "locked" position, the latch hook 460 is positioned around the locking pin 435 as illustrated in FIG. 4b. The locking pin 435 corresponds to the locking mechanism 160 of FIG. 1b. It is held in this position by the downward force of the spring 420. In the locked position, the frame 220 is prevented from pivoting along the hinges by the latch hook 460 contacting the locking pin 435. In particular implementations, the locking mechanism described above is present on both the left and right sides of the universal cargo bucket system 200. However, the locking mechanism may be only on one side in other implementations.

In operation, a user would lift the latch 415 in the upward direction disengaging the latch hook 460 from the locking pin 435. In this "unlocked" position, the frame 220 of the universal cargo bucket system 200 would then be free to pivot along its bottom hinges to the extended position. To return the universal cargo bucket system 200 to its upright position, the user would similarly lift the latch 415, raise the frame 220 to its full upright position and then release the latch 415, locking the frame back into place.

Figure 5:
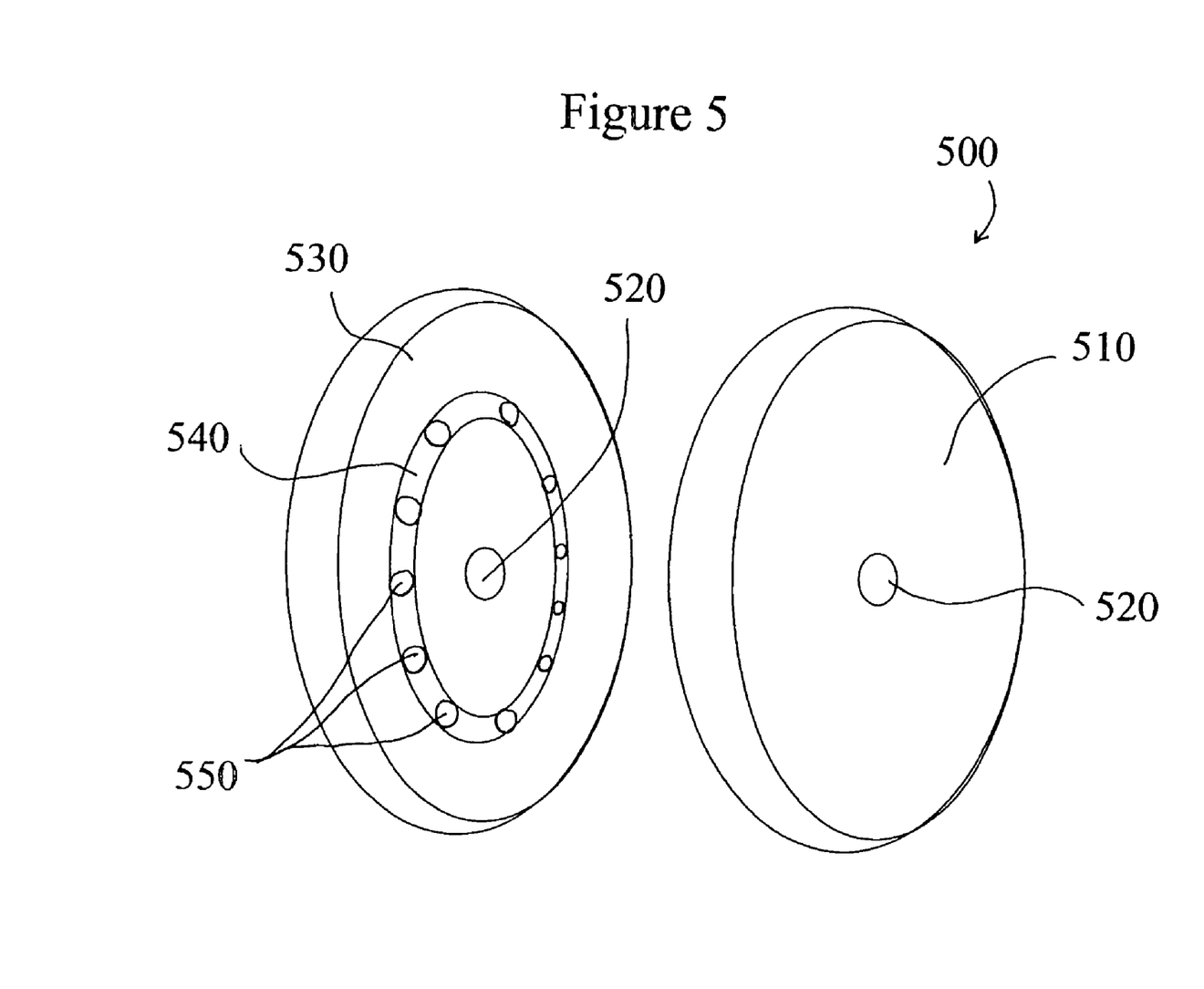
FIG. 5 illustrates a perspective view of ball bearing spacers of the universal cargo bucket system of FIG. 2.

FIG. 5 illustrates a perspective view of the right side ball bearing spacers 500 of the universal cargo bucket system 200. Ball bearing spacers 500 include an outer spacer 510 with a central hole 520 and an inner spacer 530 with a central hole 520. The inner spacer 530 also includes a bearing groove 540 and ball bearings 550. As illustrated in FIG. 5, the ball bearings 550 are located within the bearing groove 540.

The outer spacer 510 is securely affixed to the right bar 230 by any known means such as welding, soldering or bolting, for example. Similarly, the inner spacer 530 is affixed to the right side of the cargo bucket 210. The pivot bolt 270 is then passed through the right bar 230, the inner holes 520 of the outer spacer 510 and inner spacer 530 and through the cargo bucket 210 as illustrated in FIG. 2. In operation, the ball bearings 550 permit the cargo bucket 210 to pivot about the axis of the pivot bolt 270 freely.

Figure 6:
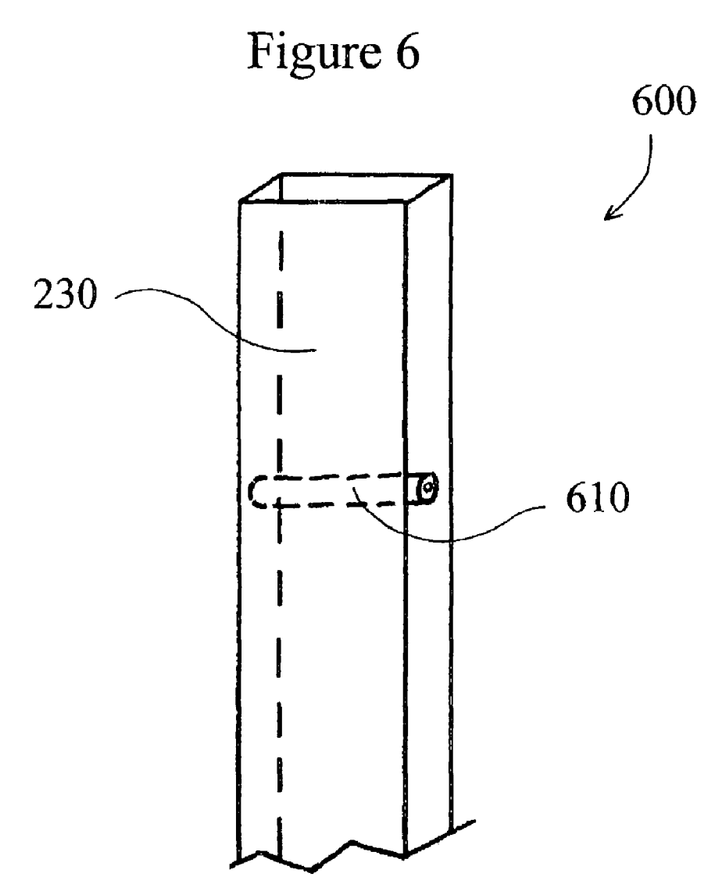
FIG. 6 illustrates a perspective view of a hollow bushing in the frame of the universal cargo bucket system of FIG. 2.

FIG. 6 illustrates a perspective view 600 of a hollow bushing in the frame of the universal cargo bucket system. FIG. 6 includes the right bar 230 and a hollow bushing 610. As illustrated, the hollow bushing 610 extends through the right bar 230 and is made of a polymer material such as plastic or nylon but may also be made of metal. In operation, the pivot bolt 270 passes through the hollow area of the hollow bushing 230 and the hollow bushing 610 provides support for the pivot bolt 270 and facilitates rotation of the pivot bolt 270 during operation by the user. As can be appreciated from the figures, the hollow bushing 610 would be in both the right bar 230 and left bar 240.

Figure 7A:
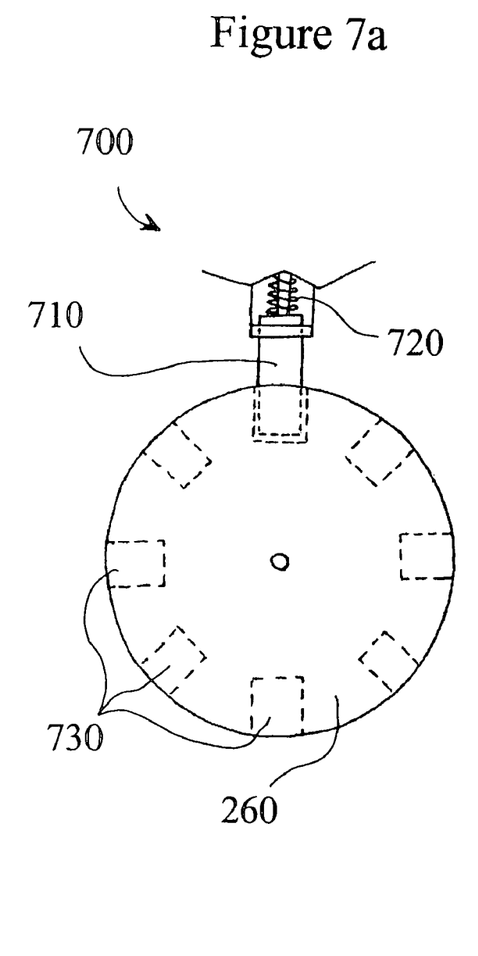
FIG. 7a illustrates a close-up side view of the bucket lock mechanism of the universal cargo bucket system of FIG. 2.

FIG. 7a illustrates a close-up side view 700 of the bucket lock mechanism 280 of the universal cargo bucket system. The bucket lock mechanism 280 includes a bucket locking pin 710, a bucket locking pin spring 720, and the spacers 260. The spacers 260 further include bucket locking pin grooves 730. As illustrated in FIG. 7a, there are multiple bucket locking pin grooves 730 around the outer circumference of the spacers 260. In the engaged position, the bottom of the bucket locking pin 710 fits inside one of the bucket locking pin grooves 730 preventing the spacer 260 from rotating and, thus, preventing the cargo bucket 210 from pivoting.

Figure 7B:
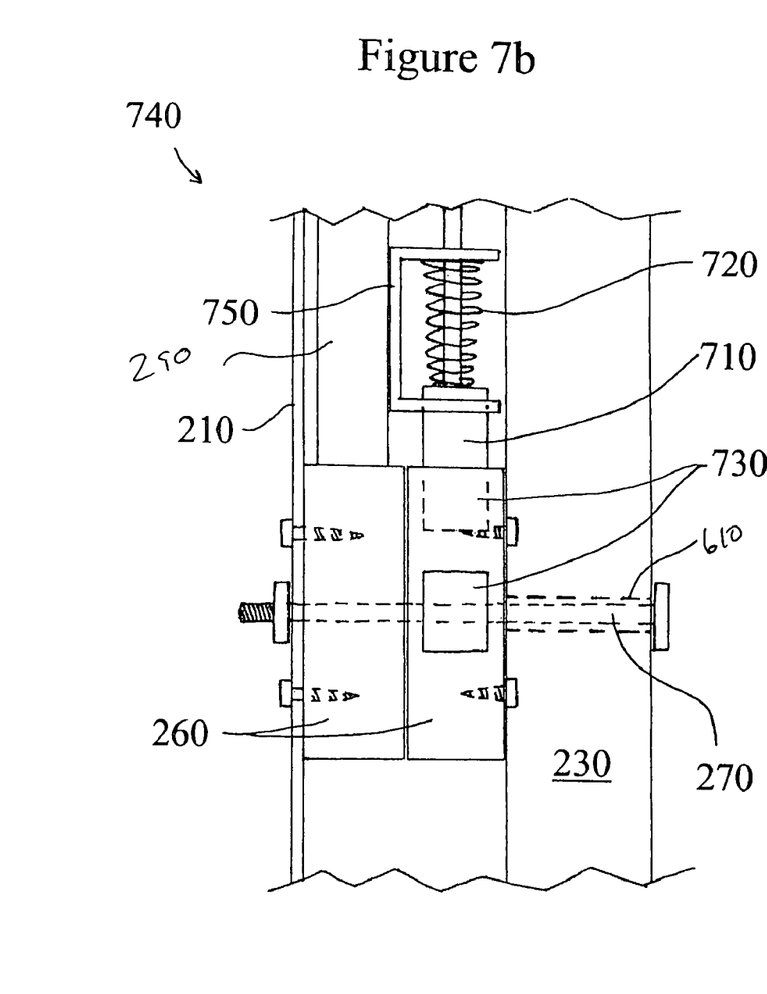
FIG. 7b illustrates a front view of the bucket lock mechanism of the universal cargo bucket system of FIG. 2.

FIG. 7b illustrates a front view 740 of the bucket lock mechanism of the universal cargo bucket system 200. As shown in FIG. 7b, the bucket lock mechanism 280 further includes a bucket locking pin support bracket 750. As discussed above with respect to FIG. 2, the spacer 260 closest to the right bar 230 is securely attached to the right bar 230. In this example the spacer 260 is screwed into the right bar 230. Similarly, the spacer 260 closest to the cargo bucket 210 is securely attached to the cargo bucket 210, again by screws. As discussed above, any suitable fastening means may be used. The pivot bolt 270 passes through the hollow bushing 610 in the right bar 270, through the spacers 260 and through the cargo bucket 210 as illustrated in FIG. 7b. The handle 290 is securely attached to the spacer 260 closest to the cargo bucket 210. The bucket locking pin support bracket 750 is attached to the bottom of the handle 290 and oriented over the spacer 260 closest to the right bar 230 as illustrated in FIG. 7b. The bucket locking pin support bracket 750 is C-shaped and comprised of metal but may also be comprised of any other suitable material. The bucket locking pin support bracket 750 includes openings at the top and bottom so that the bucket locking pin 710 may be movably inserted into the bucket locking pin support bracket 750 as illustrated in FIG. 7b. The bucket locking pin spring 720 is positioned between the bucket locking pin 710 and the upper surface of the bucket locking pin support bracket 750 as illustrated in FIG. 7b. The bucket locking pin spring 720 provides a downward force on the bucket locking pin 710 keeping the bucket locking pin 710 inserted into a bucket locking pin groove 730 in the engaged position.

In operation, when the locking pin 710 is in the engaged position, as illustrated in FIG. 7b, the locking pin 710 inserted into the bucket locking pin groove 730 prevents the cargo bucket 210 from pivoting. When the user wants to pivot the cargo bucket 210, the user may pull up on the bucket locking pin 710 removing it from the bucket locking pin groove 730, the disengaged position, which then allows the cargo bucket 210 to pivot freely in the forward or backwards direction. If the user chooses to secure the cargo bucket 210 in a pivoted, or non-upright position, the user may release the bucket locking pin 710 from the disengaged position and the bucket locking pin spring 720 will press the bucket locking pin 710 into the nearest bucket locking pin groove 730.

Figure 8A:
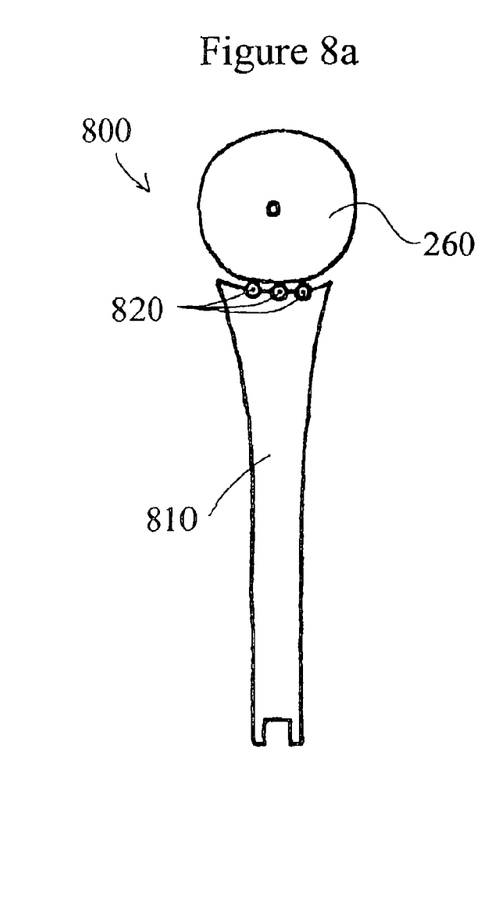
FIG. 8a illustrates a side view of a detachable load support bracket of another universal cargo bucket system.

FIG. 8a illustrates a side view of a detachable load support bracket 800 of an alternative implementation. The detachable load support bracket 800 includes a load support bracket 810 and the spacers 260. The load support bracket 810 further includes rollers 820. The rollers 820 are located at the top of the load support bracket 810 and roll in the direction of the rotating spacers 260. The load support bracket 810 is made of a strong material such as steel, but any suitable rigid material may be used. Similarly, the rollers are metal, though any suitable material known in the art, including ball bearings, may be used.

Figure 8B:
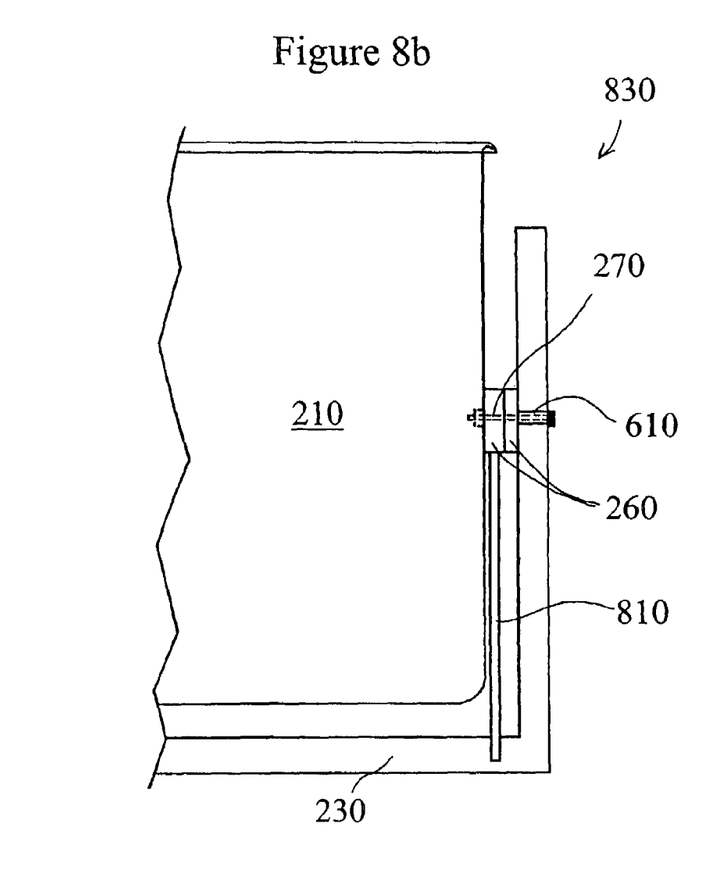
FIG. 8b illustrates a front view of a detachable load support bracket of another universal cargo bucket system.

FIG. 8b illustrates a front view 830 of the detachable load support bracket installed in the universal cargo bucket system 200 according to an alternative implementation. As illustrated in FIG. 8b, the top of the load support bracket 810 is positioned beneath the spacers 260 such that the rollers 820 are in contact with the bottom of the spacers 260. The load support bracket 810 is held in place at the bottom by fitting over the right bar 230. In operation, the detachable load support bracket 800 may be used to provide extra support for heavy loads and to reduce the strain placed upon the spacers 260 and pivot bolt 270. As can be appreciated from the figures, detachable load support bracket 800 could be installed on either or both sides of the universal cargo bucket system 200.

Figures 9A, 9B:
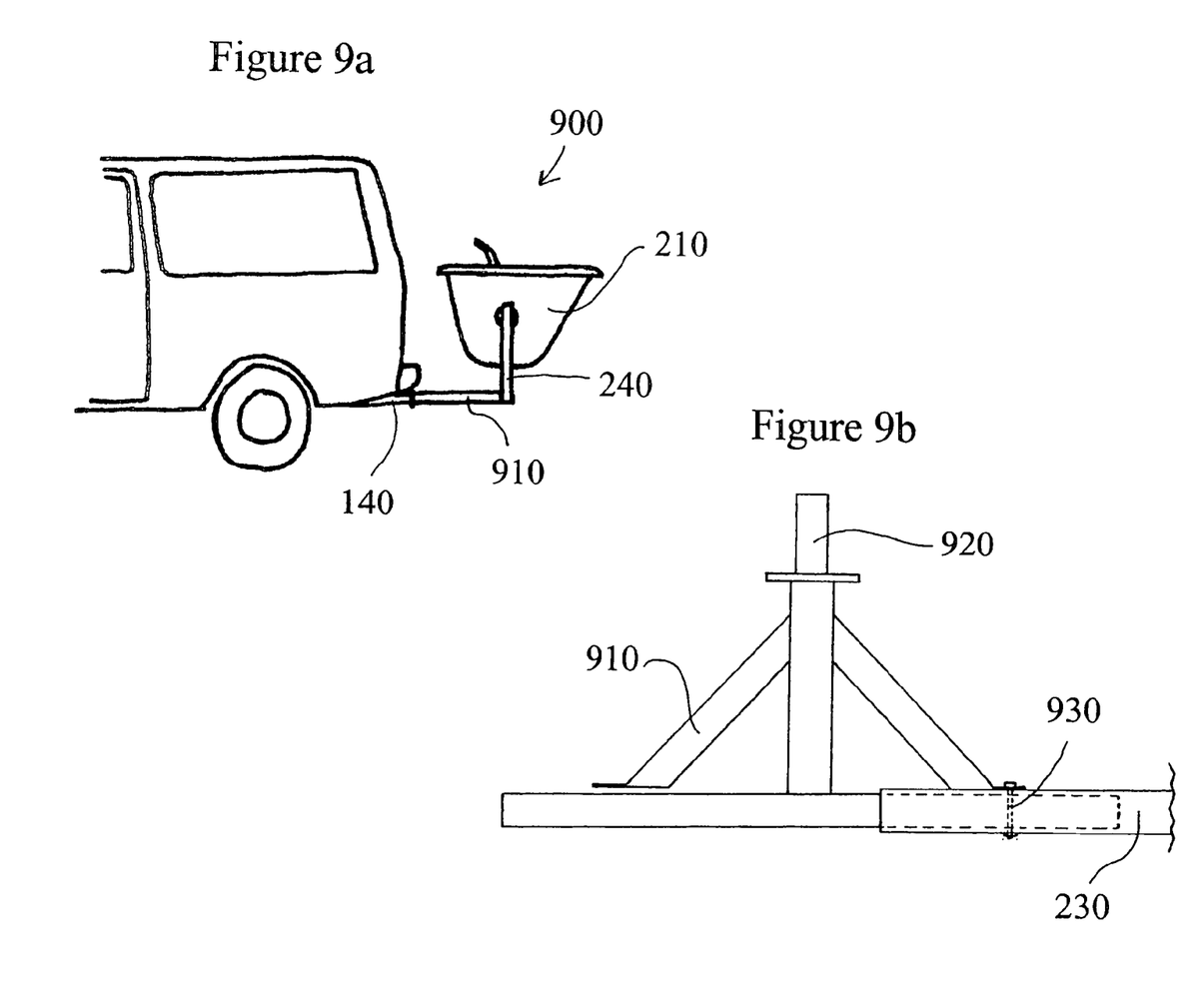
FIG. 9a illustrates another universal cargo bucket system with a hitch attachment.
FIG. 9b illustrates the hitch attachment of the universal cargo bucket system of FIG. 9.

FIG. 9a illustrates the universal cargo bucket system with a hitch attachment 900 according to an alternative implementation. The universal cargo bucket system with a hitch attachment 900 includes all of the components of the universal cargo bucket system 200 except the adjusting rod 250. Shown in FIG. 9a are the hitch receiver 140, the cargo bucket 210, the left bar 240, and a hitch attachment 910. As further discussed below, the universal cargo bucket system 200 is attached to the hitch attachment 910 and the hitch attachment 910 attaches to any vehicle with a hitch receiver 140. As is well known in the art, many types of hitch combinations are known, such as ball mounts or Class I, II, III, or IV type receiver hitches. The hitch attachment 910 may be adapted to any style hitch. Furthermore, hitches are found on many types of vehicles such as cars, trucks, tractors, lawn tractors or all-terrain vehicles ("ATVs"). Accordingly, the dimensions of universal cargo bucket system with a hitch attachment 900 may be adapted for use on any size or type of vehicle with a hitch receiver.

FIG. 9b illustrates the hitch attachment 910, which includes a hitch mount 920, a connecting bolt 930 and the right bar 230. The hitch attachment 910 is made of tubular steel, though it may be made of any suitable material. As discussed above, in the hitch attachment embodiment 900, the hitch attachment 910 takes the place of the adjusting rod 250 of the universal cargo bucket system 200. As with the adjusting rod 250, the diameter of the hitch attachment 910 is such that it fits inside the hollow ends of the bottom of the right bar 230 and the left bar 240 as illustrated in FIG. 9b. Similarly, the hitch attachment 910 is secured to the right bar 230 and left bar (not shown) by the connecting bolt 930. The hitch attachment 910 includes pre-drilled holes for the connecting bolt 930 to pass through as illustrated in FIG. 9b. The pre-drilled holes in the right bar 230 and left bar (not shown) allow the right bar 230 and left bar (not shown) to be positioned closer or further apart based on the holes selected such that the width W of the frame 220 may be adjusted by the user as with the universal cargo bucket system 200. The hitch attachment 910 is then attached to the hitch receiver of a vehicle at the hitch mount 920. As discussed above, the hitch mount 920 may readily be adapted to any type hitch receiver known and used in the art.

Figure 10:
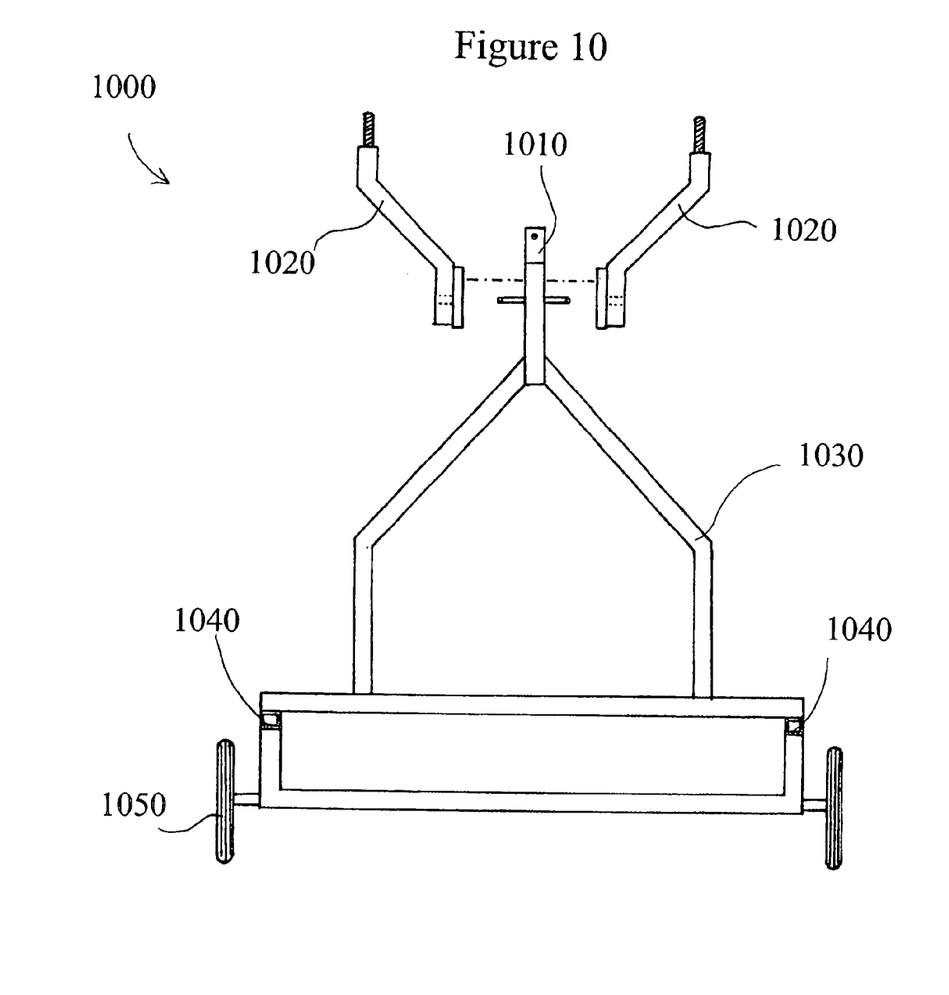
FIG. 10 illustrates a trailer attachment of another the universal cargo bucket system.

FIG. 10 illustrates the universal cargo bucket system trailer attachment 1000 according to an alternative implementation. The trailer attachment 1000 includes a hitch 1010, detachable handles 1020, a trailer frame 1030, cargo bucket mounting posts 1040 and wheels 1050. The detachable handles 1020, trailer frame 1030 and cargo bucket mounting posts 1040 are made of tubular steel but any suitable material may be used as discussed above. The cargo bucket 210 is pivotally attached to a trailer frame 1200 (discussed below) and the trailer frame is removably mounted on the cargo bucket mounting posts 1040 as illustrated in FIG. 11b.

In operation, the hitch 1010 of the trailer attachment 1000 may be attached to any vehicle with a hitch receiver 140 as discussed above. In this configuration, the trailer attachment 1000 may be towed behind the vehicle riding on the wheels 1050. Additionally, the trailer attachment 1000 may be separated from the vehicle and the handles 1020 may be installed on the trailer frame 1030 as illustrated in FIG. 10. In this configuration, the universal cargo bucket system may be operated like a wheel barrow as illustrated in FIG. 11b. The detachable handles 1020 for the trailer 1000 may also be a one piece unit that is "Y" shaped and attaches directly to the hitch 1010 of the trailer 1000. The handles 1020 may also be angled to elevate the ends to a point at which they are more ergonomic for the user. Additionally, the handles 1020 may be equipped with a downwardly extending stand to keep the trailer 1000 in a attitude that is relatively parallel to the ground. The bucket mounting post 1040 is located slightly forward of the wheels to prevent the trailer from tipping during operation and to allow for a longer fulcrum with the apparatus in wheel barrow mode.

Figure 11A:
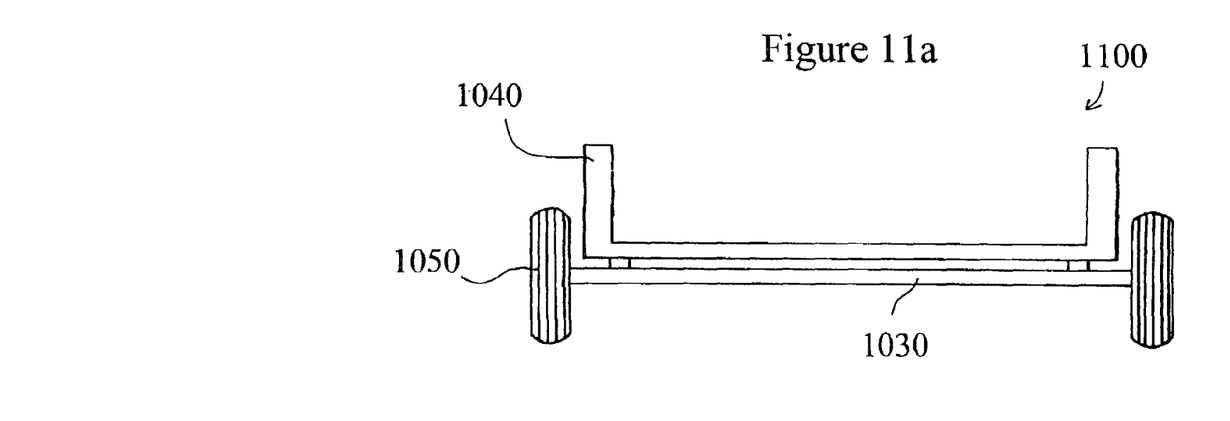
FIG. 11a illustrates a rear view of the trailer attachment of FIG. 10.

FIG. 11a illustrates a rear view of the trailer attachment 1100. The rear view 1100 further illustrates the orientation of the cargo bucket mounting posts 1040 discussed above.

Figure 11B:
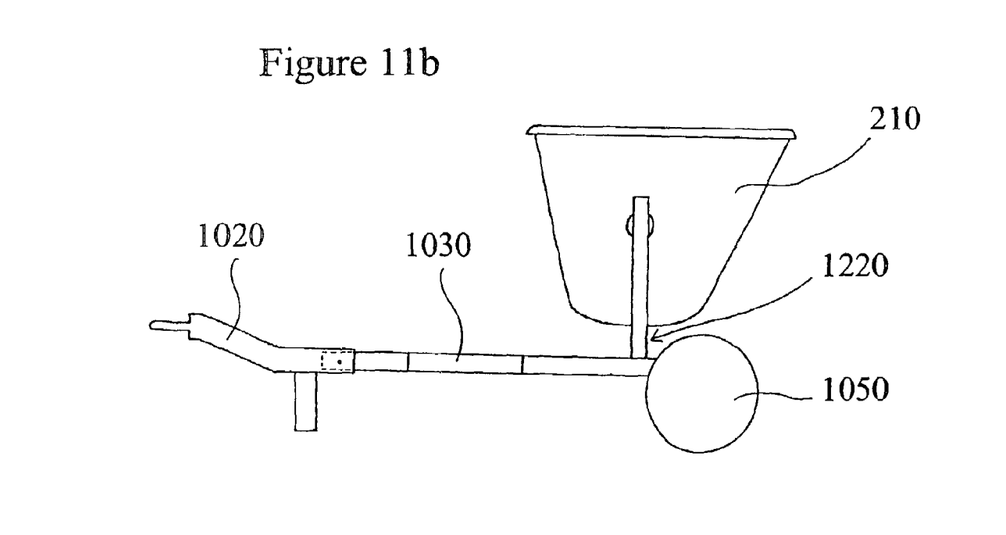
FIG. 11b illustrates a side view of the universal cargo bucket system with a trailer attachment of FIG. 10.

FIG. 11b illustrates a side view of the universal cargo bucket system with a trailer attachment 1110. The side view 1110 illustrates the cargo bucket 210 pivotally attached to the trailer frame 1200 (discussed below) and the trailer frame mounted on the cargo bucket mounting posts 1040 of the trailer frame 1030. FIG. 11b also illustrates a detachable handle 1020 attached to the trailer frame 1030.

Figure 12A:
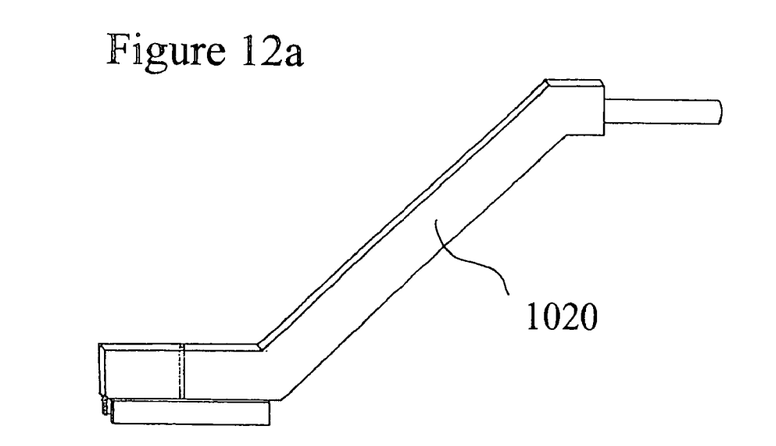
FIG. 12a illustrates a perspective view of a detachable handle.

FIG. 12a illustrates a perspective view of a detachable handle 1020.

Figure 12B:
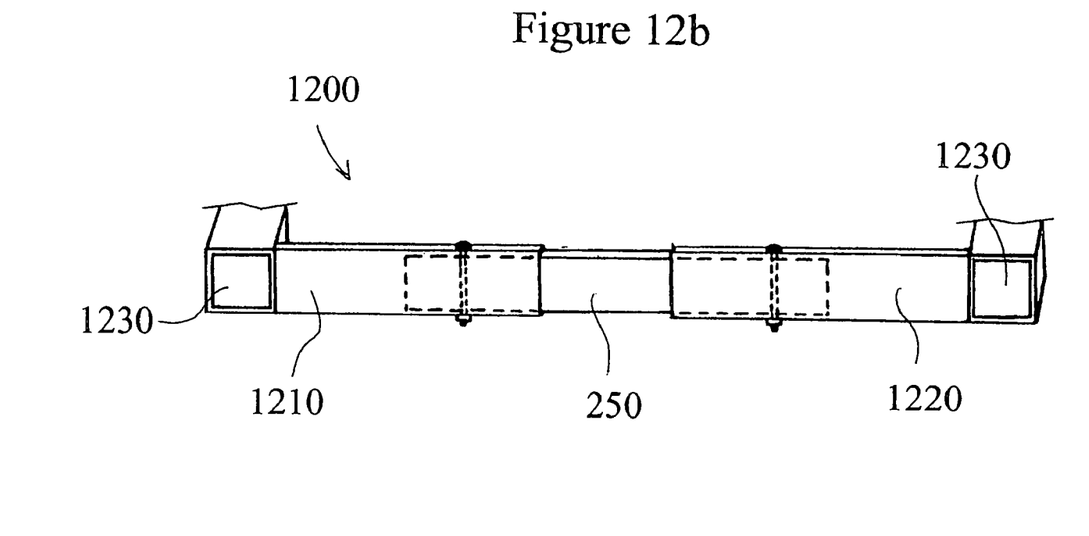
FIG. 12b illustrates a perspective view of a trailer frame of another universal cargo bucket system with a trailer attachment.

FIG. 12b illustrates a bottom perspective view of a trailer frame 1200 of the universal cargo bucket system with a trailer attachment. The trailer frame 1200 includes a left frame bar 1210, a right frame bar 1220, and the adjusting rod 250. The left frame bar 1210 and right frame bar 1220 include hollow corner bases 1230 which are made of tubular steel as discussed above. As illustrated in FIG. 12b, the adjusting rod 250 connects the left frame bar 1210 and right frame bar 1220 as discussed above with respect to FIG. 2. The hollow corner bases 1230 are large enough to mount over the cargo bucket mounting posts 1040 as illustrated in FIG. 11b. The left frame bar 1210 and right frame bar 1220 may either replace the right bar 230 and left bar 240 of the universal cargo mounting system 200 or the right bar 230 and left bar 240 may include hollow corner bases 1230 as well allowing the universal cargo mounting system 200 to attach to the trailer frame 1200 as well. The upper portions of the left frame bar 1210 and right frame bar 1220 operate in substantially the same manner as the upper portions of the right bar 230 and left bar 240 When pivotally mounted on the trailer frame 1200, the cargo bucket 210 operates in substantially the same fashion as is does on the universal cargo mounting system 200 discussed above with respect to FIG. 2.

While particular implementations have been described, it will be understood that various changes may be made and equivalents may be substituted. Accordingly, other implementations are within the scope of the following claims.

What is claimed is:

1. A cargo bucket system comprising:
a frame hingedly attached to rear corner posts of a vehicle;
a cargo bucket pivotally attached to said frame;
a locking mechanism for securing said frame in an upright position to said rear corner posts;
a handle for pivoting said cargo bucket;
a pivot bolt attaching said cargo bucket to said frame;
spacers between said frame and said cargo bucket;
wherein said handle includes a bucket lock mechanism for locking said cargo bucket in various positions.

2. The cargo bucket system of claim 1 wherein said spacers include ball bearings.

3. The cargo bucket system of claim 1 wherein said frame is adjustable.

4. A cargo bucket system comprising:
a frame hingedly attached to rear corner posts of a vehicle;
a cargo bucket pivotally attached to said frame;
a locking mechanism for securing said frame in an upright position to said rear corner posts;
a handle for pivoting said cargo bucket;
a pivot bolt attaching said cargo bucket to said frame;
spacers between said frame and said cargo bucket;
wherein said frame is adjustable; and
wherein said adjustable frame includes a right bar, a left bar, and an adjusting rod.

\* \* \* \* \*